United States Patent
Sarkis et al.

(10) Patent No.: US 11,395,270 B2
(45) Date of Patent: Jul. 19, 2022

(54) UPLINK CONTROL INFORMATION PAYLOAD SIZE

(71) Applicant: QUALCOMM Incorporated, San Diego, CA (US)

(72) Inventors: Gabi Sarkis, San Diego, CA (US); Wanshi Chen, San Diego, CA (US); Jing Jiang, San Diego, CA (US); Joseph Binamira Soriaga, San Diego, CA (US); Ying Wang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/393,086

(22) Filed: Apr. 24, 2019

(65) Prior Publication Data

US 2019/0335447 A1    Oct. 31, 2019

Related U.S. Application Data

(60) Provisional application No. 62/663,994, filed on Apr. 27, 2018.

(51) Int. Cl.
*H04W 72/04*      (2009.01)
*H04L 1/18*       (2006.01)
(Continued)

(52) U.S. Cl.
CPC ...... *H04W 72/0413* (2013.01); *H04B 7/0482* (2013.01); *H04L 1/1812* (2013.01);
(Continued)

(58) Field of Classification Search
CPC ............ H04W 72/0413; H04L 1/1812; H04L 1/1893; H04L 5/0053; H04L 5/0044;
(Continued)

(56) References Cited

U.S. PATENT DOCUMENTS

| 2011/0205981 A1* | 8/2011 | Koo | H04W 72/1284 370/329 |
| 2015/0131494 A1* | 5/2015 | He | H04W 24/04 370/280 |

(Continued)

OTHER PUBLICATIONS

Catt: "Open Issues on CBG-Based (Re) transmission", 3GPP TSG-RAN WG1 #92, 3GPP Draft; R1-1801737, 3rd Generation Partnership Project (3GPP), Mobile Competence Centre, 650, Route Des Lucioles; F-06921 Sophia-Antipolis Cedex, France, vol. RAN WG1, No. Athens, Greece; Feb. 26, 2018-Mar. 2, 2018, Feb. 17, 2018 (Feb. 17, 2018), 2 Pages, XP051397718, Retrieved from the Internet: URL: http://www.3gpp.org/ftp/tsg_ran/WG1_RL1/TSGR1_92/Docs/ [retrieved on Feb. 17, 2018].

(Continued)

*Primary Examiner* — Ivan O Latorre
(74) *Attorney, Agent, or Firm* — Qualcomm Incorporated

(57) ABSTRACT

Various aspects of the present disclosure generally relate to wireless communication. In some aspects, a user equipment may determine that a size of an uplink control information (UCI) part exceeds a UCI part payload size limit, wherein the UCI part includes hybrid automatic repeat request acknowledgment information (HARQ-ACK), and may selectively transmit the UCI part based at least in part on determining that the size of the UCI part exceeds the UCI part payload size limit. Numerous other aspects are provided.

26 Claims, 9 Drawing Sheets

(51) Int. Cl.
  *H04L 5/00* (2006.01)
  *H04B 7/0456* (2017.01)
(52) U.S. Cl.
  CPC .......... *H04L 1/1893* (2013.01); *H04L 5/0044* (2013.01); *H04L 5/0053* (2013.01); *H04L 5/001* (2013.01)
(58) Field of Classification Search
  CPC . H04L 5/001; H04L 2001/125; H04L 1/1861; H04L 1/0073; H04L 1/1671; H04L 1/1825; H04L 1/1896; H04B 7/0482
  See application file for complete search history.

(56) References Cited

U.S. PATENT DOCUMENTS

| | | | | |
|---|---|---|---|---|
| 2017/0006491 | A1* | 1/2017 | Chen | H04L 1/1671 |
| 2017/0366305 | A1* | 12/2017 | Hwang | H04L 5/001 |
| 2018/0006791 | A1* | 1/2018 | Marinier | H04L 1/1861 |
| 2018/0102892 | A1* | 4/2018 | Lunttila | H04L 1/1822 |
| 2018/0249458 | A1* | 8/2018 | He | H04L 1/1861 |
| 2018/0294938 | A1* | 10/2018 | Munier | H04L 5/0012 |
| 2018/0352545 | A1* | 12/2018 | Takeda | H04L 1/0081 |
| 2019/0037586 | A1* | 1/2019 | Park | H04L 1/0031 |
| 2019/0059013 | A1* | 2/2019 | Rahman | H04B 7/0695 |
| 2019/0124647 | A1* | 4/2019 | Li | H04L 5/0044 |
| 2019/0199477 | A1* | 6/2019 | Park | H04L 1/1861 |
| 2019/0268903 | A1* | 8/2019 | Lee | H04W 72/0446 |
| 2019/0326934 | A1* | 10/2019 | Kim | H04L 1/0061 |
| 2020/0059327 | A1* | 2/2020 | Kini | H04W 72/042 |
| 2020/0136763 | A1* | 4/2020 | Lee | H04L 5/0007 |
| 2020/0235865 | A1* | 7/2020 | Takeda | H04L 5/0055 |
| 2020/0245336 | A1* | 7/2020 | Matsumura | H04W 80/08 |
| 2020/0274660 | A1* | 8/2020 | Xiong | H04L 5/0091 |
| 2020/0403751 | A1* | 12/2020 | Baldemair | H04L 5/0055 |

OTHER PUBLICATIONS

Ericsson: "Channel Coding Techniques for URLLC", 3GPP TSG-RAN WG1 #92, 3GPP Draft; R1-1803923 Channel Coding Techniques for URLLC, 3rd Generation Partnership Project (3GPP), Mobile Competence Centre, 650, Route Des Lucioles; F-06921 Sophia-Antipolis Cedex, France, vol. RAN WG1, No. Athens, Greece; Feb. 26, 2018-Mar. 2, 2018, Apr. 15, 2018 (Apr. 15, 2018), pp. 1-7, XP051426216, Retrieved from the Internet: URL: http://www.3gpp.org/ftp/Meetings_3GPP_SYNC/RAN1/Docs/[retrieved on Apr. 15, 2018].

Huawei., et al., "Discussion on Partially Overlapped PUCCH and PUSCH", 3GPP TSG-RAN WG1 #92, 3GPP Draft; R1-1801788, 3rd Generation Partnership Project (3GPP), Mobile Competence Centre, 650, Route Des Lucioles; F-06921 Sophia-Antipolis Cedex, France, vol. RAN WG1, No. Athens, Greece; Feb. 26, 2018-Mar. 2, 2018, Feb. 17, 2018 (Feb. 17, 2018), 5 Pages, XP051397762, Retrieved from the Internet: URL: http://www.3gpp.org/ftp/tsg_ran/WG1_RL1/TSGR1_92/Docs/[retrieved on Feb. 17, 2018].

International Search Report and Written Opinion—PCT/US2019/029085—ISA/EPO—dated Aug. 9, 2019.

* cited by examiner

UPLINK CONTROL INFORMATION PAYLOAD SIZE

CROSS REFERENCE TO RELATED APPLICATION UNDER 35 U.S.C. § 119

This application claims priority to U.S. Provisional Application No. 62/663,994, filed on Apr. 27, 2018, entitled "TECHNIQUES AND APPARATUSES FOR UPLINK CONTROL INFORMATION PAYLOAD SIZE," which is hereby expressly incorporated by reference herein.

FIELD OF THE DISCLOSURE

Aspects of the present disclosure generally relate to wireless communication, and more particularly to techniques and apparatuses for uplink control information (UCI) payload size.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining that a size of an uplink control information (UCI) part exceeds a UCI part payload size limit, wherein the UCI part includes hybrid automatic repeat request acknowledgment information (HARQ-ACK); and selectively transmitting the UCI part based at least in part on determining that the size of the UCI part exceeds the UCI part payload size limit.

In some aspects, a user equipment for wireless communication may include memory and one or more processors operatively coupled to the memory. The memory and the one or more processors may be configured to determine that a size of a UCI part exceeds a UCI part payload size limit, wherein the UCI part includes HARQ-ACK; and selectively transmit the UCI part based at least in part on determining that the size of the UCI part exceeds the UCI part payload size limit.

In some aspects, a non-transitory computer-readable medium may store one or more instructions for wireless communication. The one or more instructions, when executed by one or more processors of a user equipment, may cause the one or more processors to determine that a size of a UCI part exceeds a UCI part payload size limit, wherein the UCI part includes HARQ-ACK; and selectively transmit the UCI part based at least in part on determining that the size of the UCI part exceeds the UCI part payload size limit.

In some aspects, an apparatus for wireless communication may include means for determining that a size of a UCI part exceeds a UCI part payload size limit, wherein the UCI part includes HARQ-ACK; and means for selectively transmitting the UCI part based at least in part on determining that the size of the UCI part exceeds the UCI part payload size limit.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
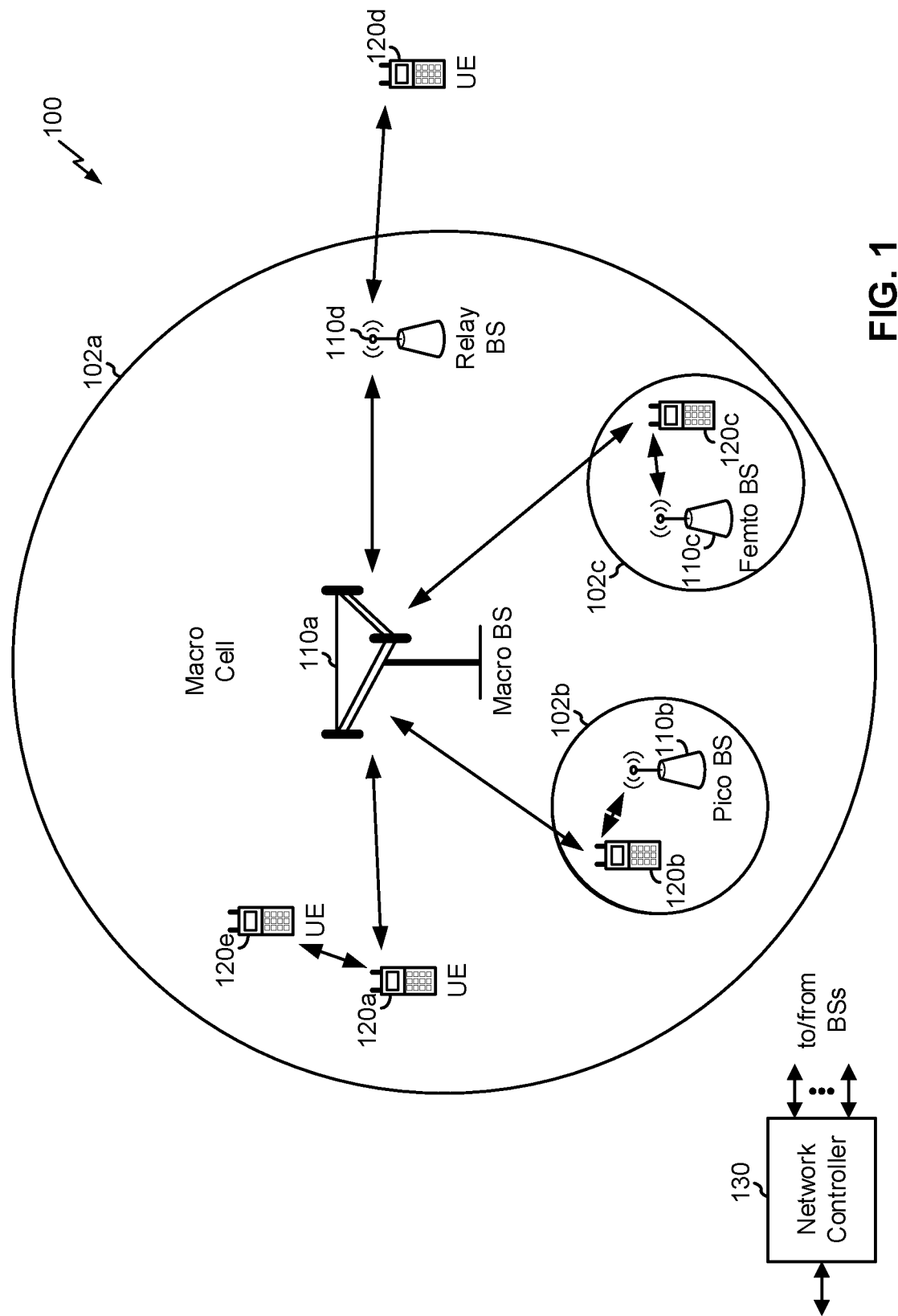
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
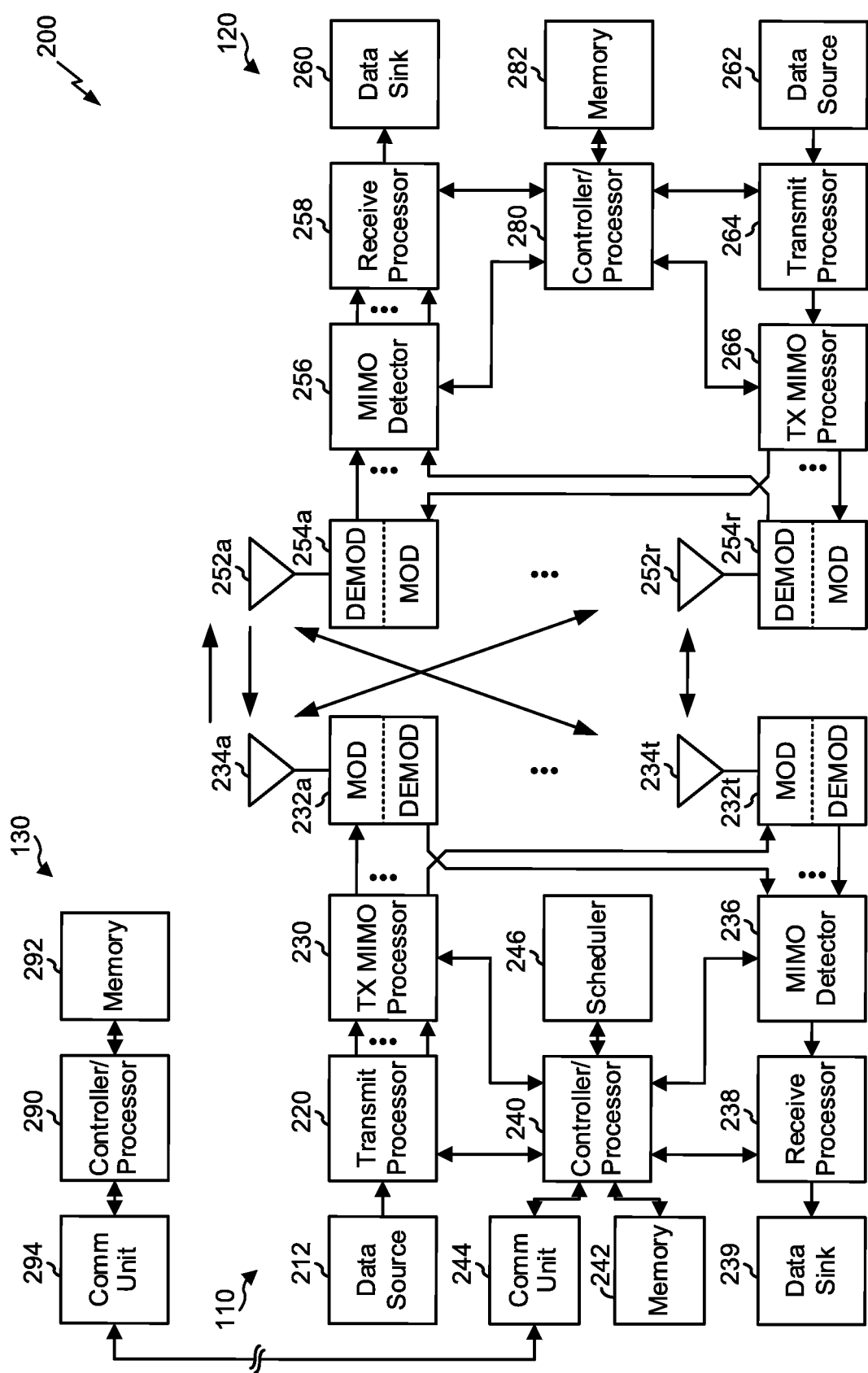
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols.

A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with UCI payload size, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining that a size of a UCI part exceeds a UCI part payload size limit, wherein the UCI part includes HARQ-ACK, means for selectively transmitting the UCI part based at least in part on determining that the size of the UCI part exceeds the UCI part payload size limit, and/or the like. In some aspects, such means may include one or more components of UE 120 described in connection with FIG. 2.

As indicated above, FIG. 2 is provided merely as an example. Other examples are possible and may differ from what was described with regard to FIG. 2.

Figure 3A:
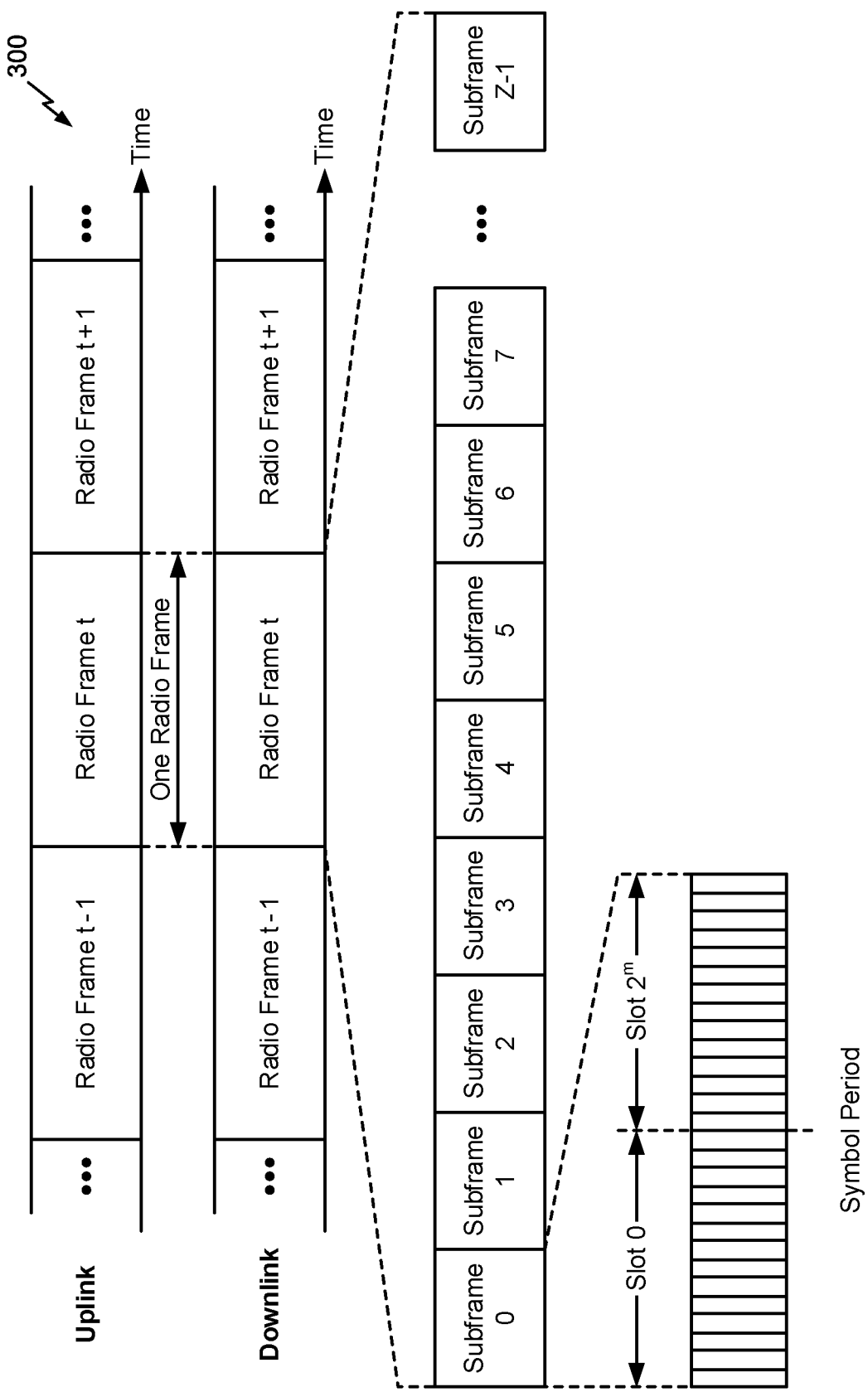
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
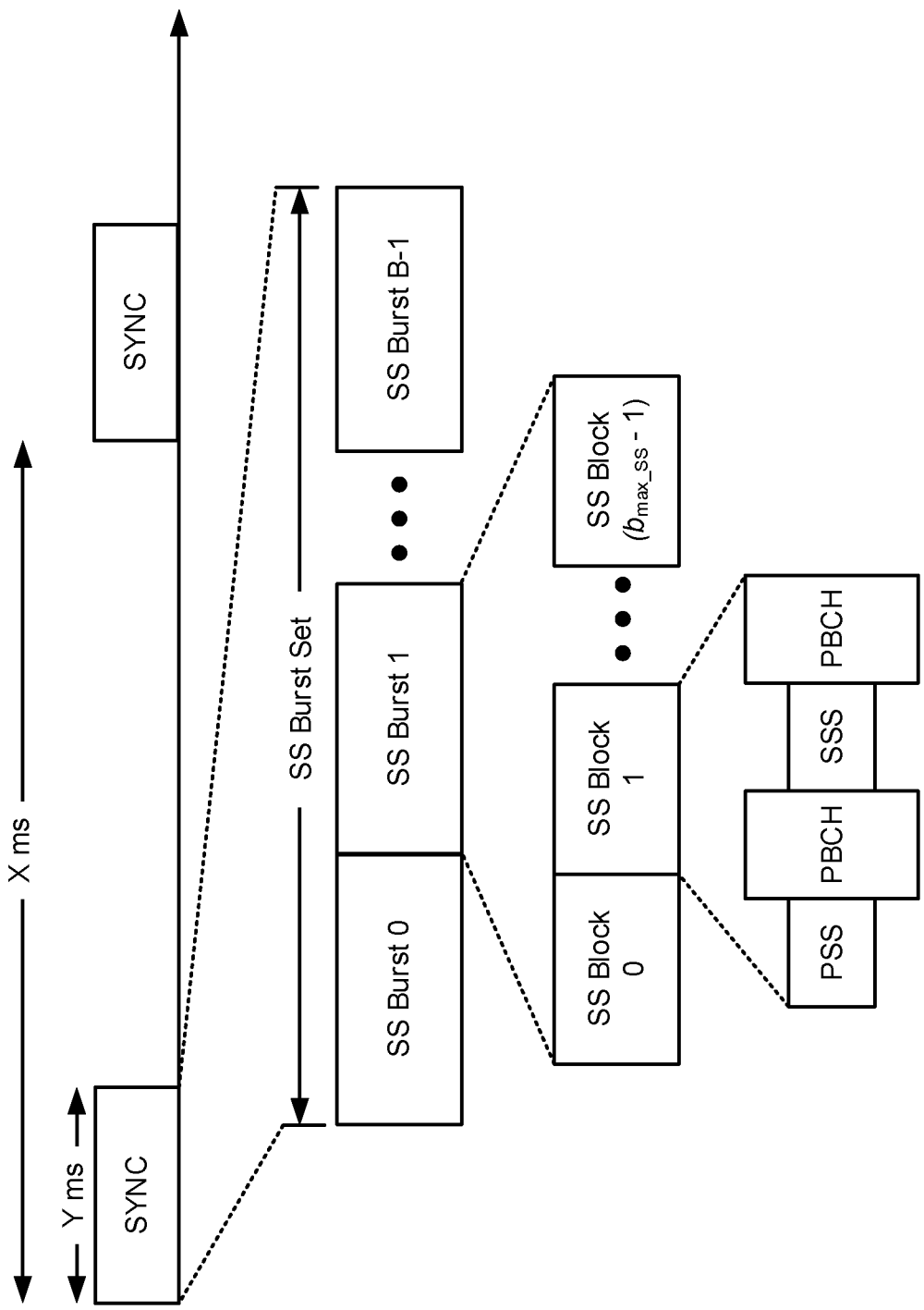
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples are possible and may differ from what was described with regard to FIGS. 3A and 3B.

Figure 4:
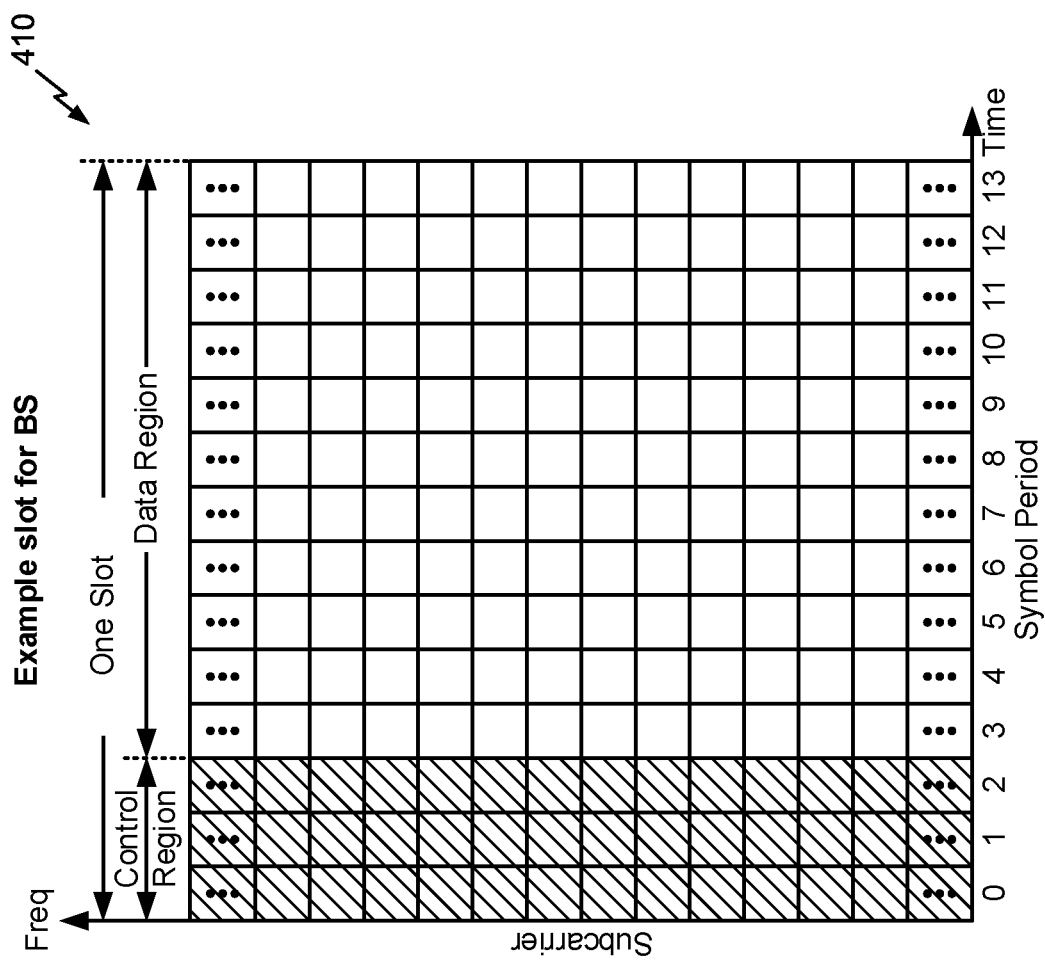
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
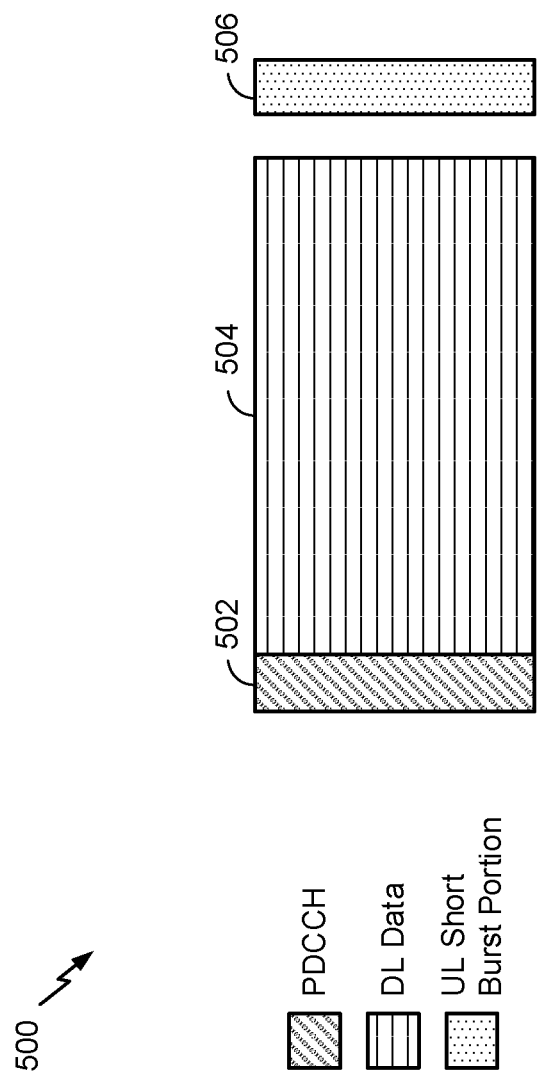
FIG. 5 is a diagram illustrating an example of a downlink (DL)-centric slot, in accordance with various aspects of the present disclosure.

FIG. 5 is a diagram 500 showing an example of a DL-centric slot or wireless communication structure. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. In some aspects, the control portion 502 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include an UL short burst portion 506. The UL short burst portion 506 may sometimes be referred to as an UL burst, an UL burst portion, a common UL burst, a short burst, an UL short burst, a common UL short burst, a common UL short burst portion, and/or various other suitable terms. In some aspects, the UL short burst portion 506 may include one or more reference signals. Additionally, or alternatively, the UL short burst portion 506 may include feedback information corresponding to various other portions of the DL-centric slot. For example, the UL short burst portion 506 may include feedback information corresponding to the control portion 502 and/or the data portion 504. Non-limiting examples of information that may be included in the UL short burst portion 506 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 5 is provided merely as an example. Other examples are possible and may differ from what was described with regard to FIG. 5.

Figure 6:
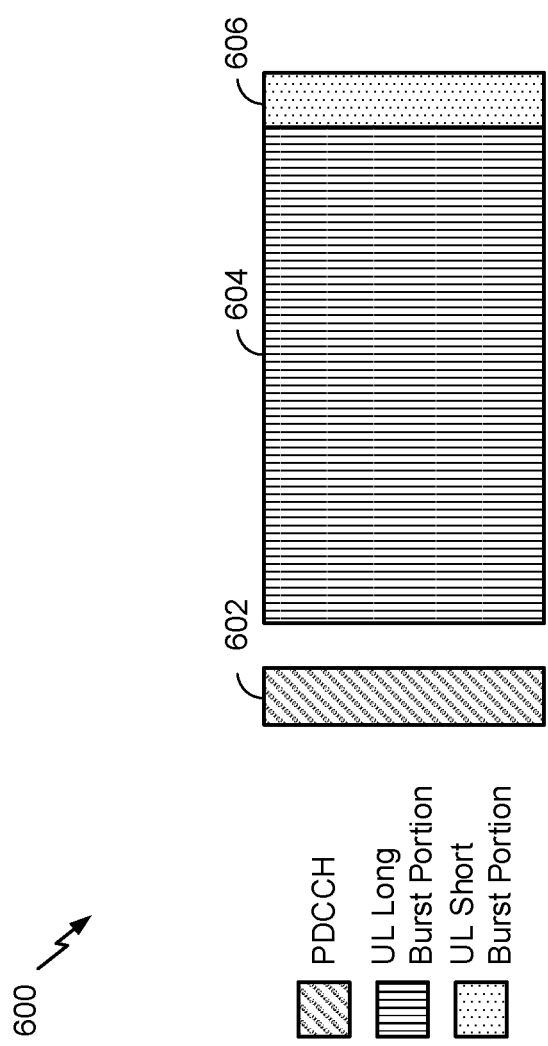
FIG. 6 is a diagram illustrating an example of an uplink (UL)-centric slot, in accordance with various aspects of the present disclosure.

FIG. 6 is a diagram 600 showing an example of an UL-centric slot or wireless communication structure. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL long burst portion 604. The UL long burst portion 604 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 606. The UL short burst portion 606 in FIG. 6 may be similar to the UL short burst portion 506 described above with reference to FIG. 5, and may include any of the information described above in connection with FIG. 5. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 6 is provided merely as an example. Other examples are possible and may differ from what was described with regard to FIG. 6.

A UE may be configured to transmit uplink control information (UCI), a portion of which is to include hybrid automatic repeat request acknowledgment information (herein referred to as HARQ-ACK). A codebook type associated with encoding the HARQ-ACK may be semi-static or dynamic. The HARQ-ACK can be code-block group (CBG) based and/or transport block (TB) based. In some cases, the portion of the UCI that is to carry such information (herein referred to as a UCI part) may further include a scheduling request (SR), a channel state indication (CSI), and/or another type of information.

A size (e.g., a number of bits) of the HARQ-ACK depends on a number of PDSCH transmissions for which feedback is to be provided, a number of TBs, a number of CBGs per TB, and a number of component carriers. Thus, as any of the above factors increase in number, the size of the HARQ-ACK (and, thus, a size of the UCI part) increases.

However, in some wireless networks, a payload size of the UCI part is limited. For example, in a NR network, the payload size of the UCI part may not exceed 1706 bits in some cases. In some cases, the UCI part payload size limit may be less than 1706 bits. This is problematic when the size of the HARQ-ACK (e.g., due to the number of PDSCH transmissions for which feedback is to be provided, the number of TBs, the number of CBGs per TB, and/or the number of component carriers) would be greater than the UCI part payload size limit (e.g., 1706 bits). In NR, the number of PDSCH transmissions may be up to eight, the number of TBs may be up to two, the number of CBGs per TB may be up to eight, and the number of component carriers may be 16 or more (e.g., 16, 32, and/or the like). As such, in a NR network, the size of the HARQ-ACK alone (without including a SR or CSI) may exceed the UCI part payload size limit (e.g., 8 bits for PDSCH transmission×2 bits for TBs×8 bits for CBGs×16 bits for component carriers=2048 bits >1706 bits). The use of additional component carriers (e.g., 32 component carriers, rather than 16) exacerbates this problem (e.g., requiring 4096 bits rather than 2048 bits).

Some aspects described herein provide techniques and apparatuses for selectively transmitting a UCI part based at least in part on whether a size of the UCI part exceeds a UCI part payload size limit.

Figure 7:
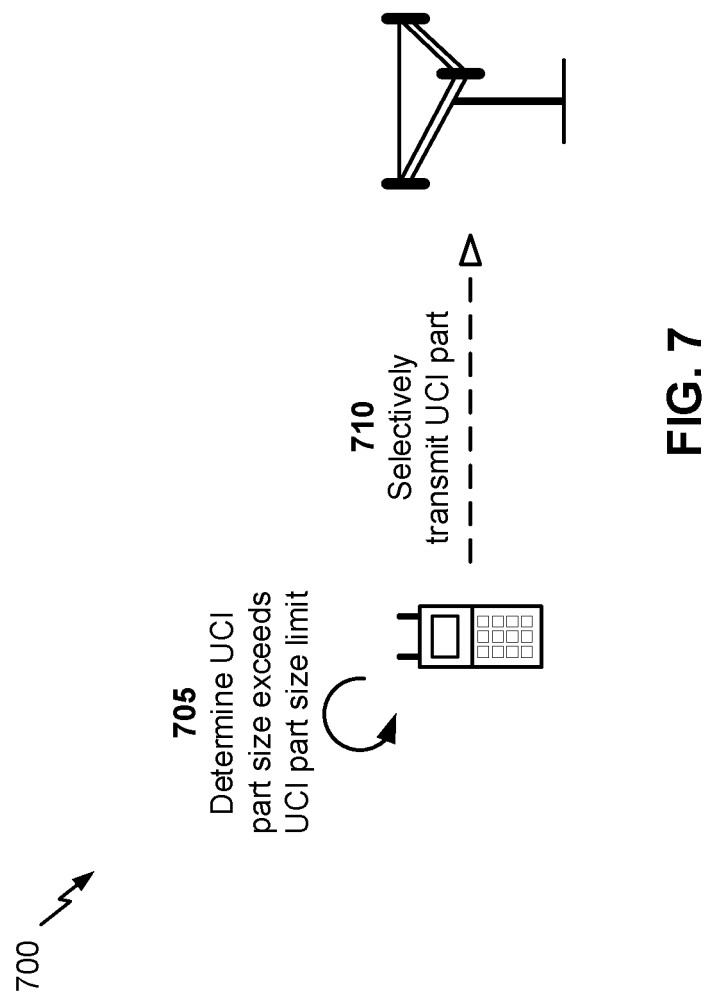
FIG. 7 is a diagram illustrating an example of selectively transmitting a UCI part based at least in part on whether a size of the UCI part exceeds a UCI part payload size limit, in accordance with various aspects of the present disclosure.

FIG. 7 is a diagram illustrating an example 700 of selectively transmitting a UCI part based at least in part on whether a size of the UCI part exceeds a UCI part payload size limit, in accordance with various aspects of the present disclosure.

As shown in FIG. 7, and by reference number 705, a UE (e.g., UE 120) may determine that a size of UCI part exceeds a UCI part payload size limit.

In some aspects, the UE may determine that the size of the UCI part exceeds the UCI part payload size limit based at least in part on a size of HARQ-ACK included in the UCI part. As described above, the size of the HARQ-ACK is based at least in part on a number of PDSCH transmissions for which feedback is to be provided, a number of TBs, a number of CBGs per TB, and a number of component carriers. For example, when feedback is to be provided for eight PDSCH transmissions, and there are two TBs, eight CBGs per TB, and 16 component carriers, the size of the HARQ-ACK is 2048 bits (e.g., e.g., 8 bits for PDSCH transmission×2 bits for TBs×8 bits for CBGs×16 bits for component carriers=2048 bits). In a case where the UCI part payload size limit is 1706 bits or less (e.g., as in NR), the UE may determine that the size of the UCI part (alone) exceeds the UCI part payload size limit.

In some aspects, such as when the UCI part is to be transmitted in a PUCCH, the UCI part may include a SR and/or CSI. In some aspects, such as when the UCI part is to be transmitted in a PUSCH, the UCI part may include only the HARQ-ACK and/or may include the HARQ-ACK and a SR (e.g., the CSI may be separately transmitted in one or more other UCI parts). Thus, in some aspects, the UE may determine that the UCI part exceeds the UCI part payload size limit based at least in part on the size of the HARQ-ACK in addition to a size of a SR and/or a size of CSI.

In some aspects, the UE may determine the UCI part payload size limit based at least in part on information provided by another device, such as a base station (e.g., BS 110). For example, the base station may configure the UE with information that identifies the UCI part payload size limit.

As shown in FIG. 7, and by reference number 710, the UE may selectively transmit the UCI part based at least in part on determining that the size of the UCI part exceeds the UCI part payload size limit.

In some aspects, the UE may not transmit the UCI part when the UE determines that the size of the UCI part exceeds the UCI part payload size limit. For example, in some aspects, the UE may be configured to determine that the UCI part has an invalid configuration when the size of the UCI part exceeds the UCI part payload size limit. In such a case, the UE may determine that the size of the UCI part exceeds the UCI part payload size limit, may determine that the UCI part has an invalid configuration, and may not transmit the UCI part. In such a case, the determination of whether the size of the UCI part exceeds the UCI part payload size limit may or may not take into account a size of a SR included in the UCI part (e.g., depending on a configuration of the UE).

In some aspects, the UCI part may be identified as having an invalid configuration when the size of the UCI part exceeds the UCI part payload size limit and when a HARQ-ACK codebook, associated with the HARQ-ACK, is semi-static. Additionally, or alternatively, the UCI part may be identified as having an invalid configuration when the size of the UCI part exceeds the UCI part payload size limit and when a HARQ-ACK codebook, associated with the HARQ-ACK, is dynamic.

In some aspects, the UE may transmit the UCI part based at least in part on determining that the size of the UCI part exceeds the UCI part payload size limit. For example, in some aspects, the UE may determine that the size of the UCI part exceeds the UCI part payload size limit, and may determine that a HARQ-ACK codebook type, associated with the HARQ-ACK, is dynamic. In some aspects, when the UE determines that the HARQ-ACK codebook type, associated with the HARQ-ACK, is dynamic, then the UE may be configured to determine downlink assignment information (DAI) included in downlink control information (DCI), and may transmit the UCI part based at least in part on the DAI. Here, the UE may transmit the UCI part in multiple parts, in accordance with a size identified by the DAI, such that a size of a given one of the multiple parts does not exceed the UCI part payload size limit.

As another example, in some aspects, the UE may determine that the size of the UCI part exceeds the UCI part payload size limit, may bundle the HARQ-ACK based at least in part on the determination, and may transmit the UCI part based at least in part on bundling the HARQ-ACK. Bundling the HARQ-ACK may reduce a size of the HARQ-ACK (e.g., such that the size of the UCI part is reduced to be below the UCI part payload size limit). In some aspects, the UE may spatially bundle bits, associated with the HARQ-ACK, for a same CBG in one or more component carriers and/or may spatially bundle bits, associated with the HARQ-ACK, for a same CBG in a plurality of TBs. In some aspects, the UE may bundle bits for one or more CBGs in a same component carrier. In some aspects, the UE may bundle bits for one or more CBGs in one or more component carriers. In some aspects, after bundling the HARQ-ACK, the UE may transmit the UCI part.

As another example, in some aspects, the UE may determine that the size of the UCI part exceeds the UCI part payload size limit, may segment the UCI part into at least three code blocks (e.g., 3, 4, or more) based at least in part on the determination, and may transmit the UCI part based at least in part on segmenting the UCI part into at least three code blocks. Segmenting the UCI part into at least three code blocks (e.g., as compared to two code blocks) may allow the size of the UCI part to exceed the UCI part payload size limit (e.g., the 1706 bit size limit is dictated by permitting UEs to segment a UCI part into a maximum of two code blocks).

As another example, in some aspects, the UE may determine that the size of the UCI part exceeds the UCI part payload size limit, may use a polar code with a length that is greater than 1024 (for encoding the UCI part) based at least in part on the determination, and may transmit the UCI part based at least in part on using the polar code with the length that is greater than 1024.

In some aspects, the UE may selectively transmit the UCI part without regard to whether the UCI part is to be transmitted on a PUCCH or on a PUSCH. In other words, the basis on which the UE selectively transmits a UCI part may be the same regardless of whether the UCI part is to be transmitted on a PUCCH or a PUSCH (e.g., if the UCI part is determined to be invalid for transmission on a PUCCH due exceeding the UCI part payload size limit, then the UE would automatically deem the UCI part as invalid for transmission a PUSCH).

In some aspects, the UE may selectively transmit the UCI part based at least in part on whether the UCI part is to be transmitted on a PUCCH or on a PUSCH. In other words, the basis for selectively transmitting the UCI part may take into account whether the UCI part is scheduled for transmission on a PUCCH or on a PUSCH.

In some aspects, the UE may selectively transmit the UCI part based at least in part on a configuration corresponding to a slot associated with transmitting the UCI part. In other words, due to the nature of the UCI part payload size limit varying from slot to slot, a given UCI part may exceed the UCI part payload size limit associated with a first slot, but may not exceed a UCI part payload size limit associated with a second slot. Thus, determination of whether the size of the UCI part exceeds the UCI part payload size limit, and the subsequent selective transmission, may be performed on a slot-by-slot basis.

In some aspects, the UE may selectively transmit based at least in part on whether the UCI part is associated with enhanced mobile broadband (eMBB) traffic or ultra-reliable low-latency communication (URLLC) traffic. For example, the size of the UCI part may depend on whether the UCI part is associated with eMBB traffic or URLLC traffic (e.g., since a UCI part configuration may differ for different types of traffic). As such, the selective transmission of the UCI part can depend on whether the UCI part is associated with eMBB traffic or URLLC traffic.

As indicated above, FIG. 7 is provided as an example. Other examples are possible and may differ from what was described with respect to FIG. 7.

Figure 8:
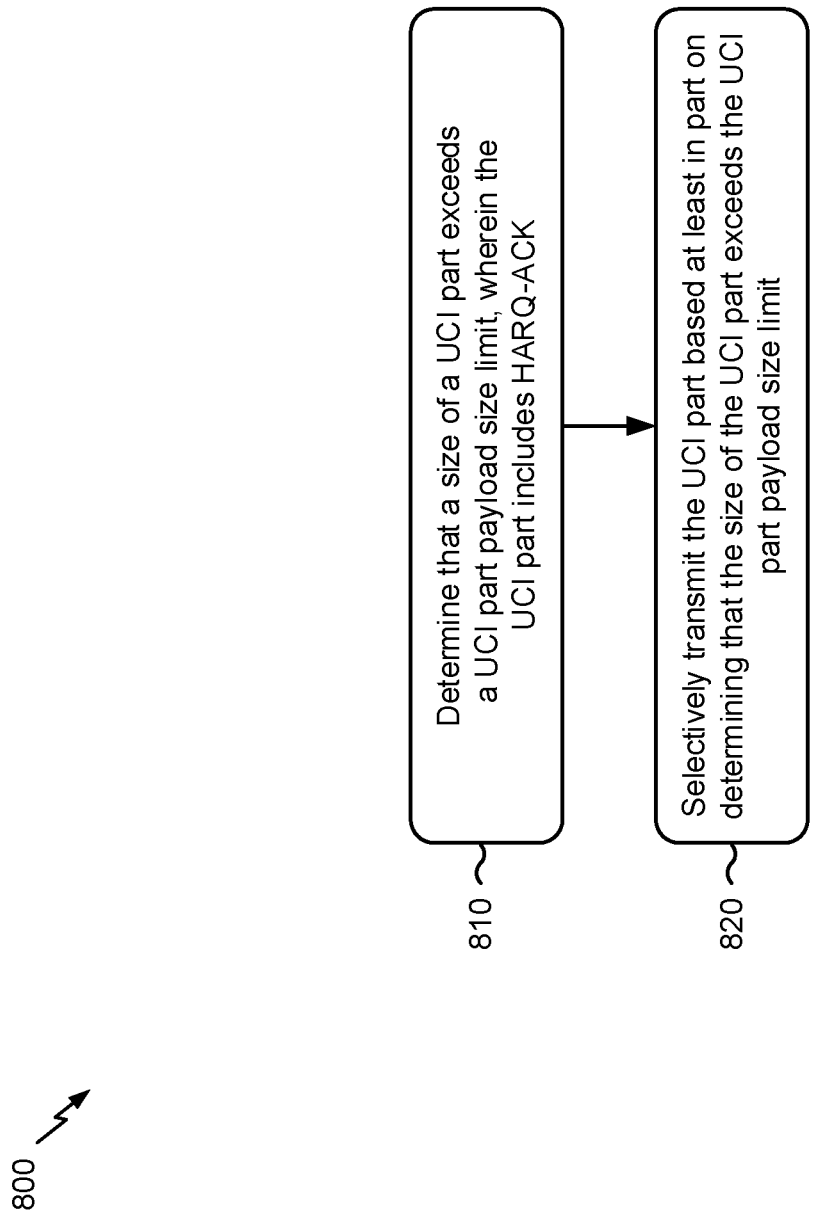
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120) performs selective transmission of a UCI part based at least in part on determining that a size of the UCI part exceeds a UCI part payload size limit.

As shown in FIG. 8, in some aspects, process 800 may include determining that a size of a UCI part exceeds a UCI part payload size limit, wherein the UCI part includes HARQ-ACK (block 810). For example, the UE (e.g., using controller/processor 280, transmit processer 264, and/or the like) may determine that a size of a UCI part exceeds a UCI part payload size limit, wherein the UCI part includes HARQ-ACK, as described above.

As shown in FIG. 8, in some aspects, process 800 may include selectively transmitting the UCI part based at least in part on determining that the size of the UCI part exceeds the UCI part payload size limit (block 820). For example, the UE (e.g., using controller/processor 280, transmit processer 264, and/or the like) may selectively transmit the UCI part based at least in part on determining that the size of the UCI part exceeds the UCI part payload size limit, as described above.

Process 800 may include additional aspects, such as any single aspect or any combination of aspects described below and/or in connection with one or more other processes described elsewhere herein.

In a first aspect, the UCI part is identified as having an invalid configuration based at least in part on the size of the UCI part being determined as exceeding the UCI part payload size limit, and the UCI part is not transmitted based at least in part on the UCI part being identified as having an invalid configuration.

In a second aspect, in combination with the first aspect, the UCI part further includes scheduling request information.

In a third aspect, in combination with any one or more of the first and second aspects, the UCI part is identified as having an invalid configuration based at least in part on a HARQ-ACK codebook type, associated with the HARQ-ACK, being semi-static.

In a fourth aspect, in combination with any one or more of the first through third aspects, the UCI part is identified as having an invalid configuration based at least in part on a HARQ-ACK codebook type, associated with the HARQ-ACK, being dynamic.

In a fifth aspect, alone or in combination with any one or more of the first through fourth aspects, the UCI part is transmitted based at least in part on a downlink assignment index (DAI) field included in downlink control information (DCI) and based at least in part on determining that a HARQ-ACK codebook, associated with the HARQ-ACK, is dynamic.

In a sixth aspect, alone or in combination with any one or more of the first through fifth aspects, the UCI part is transmitted based at least in part on bundling the HARQ-ACK, wherein the HARQ-ACK is bundled based at least in part on the size of the UCI part being determined to exceed the UCI part payload size limit.

In a seventh aspect, in combination with the sixth aspect, the HARQ-ACK is bundled by spatially bundling bits for a same code-block group (CBG) in one or more component carriers. In an eighth aspect, in combination with the sixth aspect, the HARQ-ACK is bundled by spatially bundling bits for a same code-block group (CBG) in a plurality of transport blocks (TBs). In a ninth aspect, in combination with the sixth aspect, the HARQ-ACK is bundled by spatially bundling bits for a same code-block group (CBG) in a plurality of transport blocks (TBs) and in one or more component carriers. In a tenth aspect, in combination with the sixth aspect, the HARQ-ACK is bundled by bundling bits for one or more code-block groups (CBGs) in a same component carrier. In an eleventh aspect, in combination with the sixth aspect, the HARQ-ACK is bundled by bundling bits for one or more code-block groups (CBGs) in one or more component carriers.

In a twelfth aspect, alone or in combination with any one or more of the first through eleventh aspects, the UCI part is segmented into at least three code blocks based at least in part on the size of the UCI part being determined to exceed the UCI part payload size limit, wherein the UCI part is transmitted based at least in part on segmenting the UCI part into the at least three code blocks.

In a thirteenth aspect, alone or in combination with any one or more of the first through twelfth aspects, a polar code with a length that is greater than 1024 is used for encoding the UCI part based at least in part on the size of the UCI part being determined to exceed the UCI part payload size limit, wherein the UCI part is transmitted based at least in part on using the polar code with the length that is greater than 1024 for encoding the UCI part.

In a fourteenth aspect, alone or in combination with any one or more of the first through thirteenth aspects, the UCI part is selectively transmitted without regard to whether the UCI part is to be transmitted on a physical uplink control channel (PUCCH) or on a physical uplink shared channel (PUSCH).

In a fifteenth aspect, alone or in combination with any one or more of the first through fourteenth aspects, the UCI part is selectively transmitted based at least in part on whether the UCI part is to be transmitted on a physical uplink control channel (PUCCH) or on a physical uplink shared channel (PUSCH).

In a sixteenth aspect, alone or in combination with any one or more of the first through fifteenth aspects, the UCI part is selectively transmitted based at least in part on a configuration corresponding to a slot associated with transmitting the UCI part.

In a seventeenth aspect, alone or in combination with any one or more of the first through sixteenth aspects, the UCI part is selectively transmitted based at least in part on whether the UCI part is associated with enhanced mobile broadband (eMBB) traffic or ultra-reliable low-latency communication (URLLC) traffic.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining that a size of an uplink control information (UCI) part exceeds a UCI part payload size limit,
      wherein the UCI part is a portion of a UCI that includes hybrid automatic repeat request acknowledgment information (HARQ-ACK);
   determining a downlink assignment index (DAI) field included in downlink control information (DCI);
   determining that a HARQ-ACK codebook, associated with the HARQ-ACK, is dynamic; and
   selectively transmitting the UCI part based at least in part on determining that the size of the UCI part exceeds the UCI part payload size limit,
   wherein when the HARQ-ACK codebook is dynamic, the UCI part is transmitted in multiple parts, in accordance with a size identified by the DAI, such that a size of each of the multiple parts does not exceed the UCI part payload size limit, and
   wherein the UCI is otherwise not transmitted based at least in part on the size of the UCI part exceeding the UCI part payload size limit.

2. The method of claim 1, wherein a polar code with a length that is greater than 1024 is used for encoding the UCI part based at least in part on the size of the UCI part being determined to exceed the UCI part payload size limit,
   wherein the UCI part is transmitted based at least in part on using the polar code with the length that is greater than 1024 for encoding the UCI part.

3. The method of claim 1, wherein the UCI part is selectively transmitted based at least in part on whether the UCI part is associated with enhanced mobile broadband (eMBB) traffic or ultra-reliable low-latency communication (URLLC) traffic.

4. The method of claim 1, wherein the UCI part is identified as having an invalid configuration based at least in part on the size of the UCI part being determined as exceeding the UCI part payload size limit.

5. The method of claim 4, wherein the UCI part further includes scheduling request information (SR).

6. The method of claim 4, wherein the UCI part is identified as having an invalid configuration based at least in part on a HARQ-ACK codebook type, associated with the HARQ-ACK, being semi-static.

7. The method of claim 4, wherein the UCI part is identified as having an invalid configuration based at least in part on a HARQ-ACK codebook type, associated with the HARQ-ACK, being dynamic.

8. The method of claim 1, wherein the UCI part is transmitted based at least in part on bundling the HARQ-ACK,
wherein the HARQ-ACK is bundled based at least in part on the size of the UCI part being determined to exceed the UCI part payload size limit, and
wherein the size of the UCI part when bundling the HARQ-ACK is within the UCI part payload size limit.

9. The method of claim 8, wherein the HARQ-ACK is bundled by spatially bundling bits for a same code-block group (CBG) in one or more component carriers.

10. The method of claim 8, wherein the HARQ-ACK is bundled by spatially bundling bits for a same code-block group (CBG) in a plurality of transport blocks (TBs).

11. The method of claim 8, wherein the HARQ-ACK is bundled by spatially bundling bits for a same code-block group (CBG) in a plurality of transport blocks (TBs) and in one or more component carriers.

12. The method of claim 8, wherein the HARQ-ACK is bundled by bundling bits for one or more code-block groups (CBGs) in a same component carrier.

13. The method of claim 8, wherein the HARQ-ACK is bundled by bundling bits for one or more code-block groups (CBGs) in one or more component carriers.

14. The method of claim 1, wherein the UCI part is segmented into at least three code blocks based at least in part on the size of the UCI part being determined to exceed the UCI part payload size limit,
wherein the UCI part is transmitted based at least in part on segmenting the UCI part into the at least three code blocks.

15. The method of claim 1, wherein the UCI part is selectively transmitted without regard to whether the UCI part is to be transmitted on a physical uplink control channel (PUCCH) or on a physical uplink shared channel (PUSCH).

16. The method of claim 1, wherein the UCI part is selectively transmitted based at least in part on whether the UCI part is to be transmitted on a physical uplink control channel (PUCCH) or on a physical uplink shared channel (PUSCH).

17. The method of claim 1, wherein the UCI part is selectively transmitted based at least in part on a configuration corresponding to a slot associated with transmitting the UCI part.

18. A user equipment (UE) for wireless communication, comprising:
memory; and
one or more processors operatively coupled to the memory, the memory and the one or more processors configured to:
determine that a size of an uplink control information (UCI) part exceeds a UCI part payload size limit, wherein the UCI part is a portion of a UCI that includes hybrid automatic repeat request acknowledgment information (HARQ-ACK);
determine a downlink assignment index (DAI) field included in downlink control information (DCI);
determine that a HARQ-ACK codebook, associated with the HARQ-ACK, is dynamic; and
selectively transmit the UCI part based at least in part on determining that the size of the UCI part exceeds the UCI part payload size limit,
wherein, when the HARQ-ACK codebook is dynamic, the UCI part is transmitted in multiple parts, in accordance with a size identified by the DAI, such that a size of each of the multiple parts does not exceed the UCI part payload size limit; and
wherein the UCI is not transmitted otherwise.

19. The UE of claim 18, wherein a polar code with a length that is greater than 1024 is used for encoding the UCI part based at least in part on the size of the UCI part being determined to exceed the UCI part payload size limit,
wherein the UCI part is transmitted based at least in part on using the polar code with the length that is greater than 1024 for encoding the UCI part.

20. The UE of claim 18, wherein the UCI part is selectively transmitted based at least in part on whether the UCI part is associated with enhanced mobile broadband (eMBB) traffic or ultra-reliable low-latency communication (URLLC) traffic.

21. An apparatus for wireless communication, comprising:
means for determining that a size of an uplink control information (UCI) part exceeds a UCI part payload size limit,
wherein the UCI part is a portion of a UCI that includes hybrid automatic repeat request acknowledgment information (HARQ-ACK);
means determining a downlink assignment index (DAI) field included in downlink control information (DCI);
means determining that a HARQ-ACK codebook, associated with the HARQ-ACK, is dynamic; and
means for selectively transmitting the UCI part based at least in part on determining that the size of the UCI part exceeds the UCI part payload size limit,
wherein, when the HARQ-ACK codebook is dynamic, the UCI part is transmitted in multiple parts, in accordance with a size identified by the DAI, such that a size of each of the multiple parts does not exceed the UCI part payload size limit; and
wherein the UCI is not transmitted otherwise.

22. The apparatus of claim 21, wherein a polar code with a length that is greater than 1024 is used for encoding the UCI part based at least in part on the size of the UCI part being determined to exceed the UCI part payload size limit,
wherein the UCI part is transmitted based at least in part on using the polar code with the length that is greater than 1024 for encoding the UCI part.

23. The apparatus of claim 21, wherein the UCI part is selectively transmitted based at least in part on whether the UCI part is associated with enhanced mobile broadband (eMBB) traffic or ultra-reliable low-latency communication (URLLC) traffic.

24. A non-transitory computer-readable medium storing instructions for wireless communication, the instructions comprising:
one or more instructions that, when executed by one or more processors of a user equipment (UE), cause the one or more processors to:
determine that a size of an uplink control information (UCI) part exceeds a UCI part payload size limit,
wherein the UCI part is a portion of a UCI that includes hybrid automatic repeat request acknowledgment information (HARQ-ACK);
determine a downlink assignment index (DAI) field included in downlink control information (DCI);

determine that a HARQ-ACK codebook, associated with the HARQ-ACK, is dynamic; and selectively transmit the UCI part based at least in part on determining that the size of the UCI part exceeds the UCI part payload size limit, wherein, when the HARQ-ACK codebook is dynamic, the UCI part is transmitted in multiple parts, in accordance with a size identified by the DAI, such that a size of each of the multiple parts does not exceed the UCI part payload size limit; and wherein the UCI is not transmitted otherwise.

25. The non-transitory computer-readable medium of claim 24, wherein a polar code with a length that is greater than 1024 is used for encoding the UCI part based at least in part on the size of the UCI part being determined to exceed the UCI part payload size limit, wherein the UCI part is transmitted based at least in part on using the polar code with the length that is greater than 1024 for encoding the UCI part.

26. The non-transitory computer-readable medium of claim 24, wherein the UCI part is selectively transmitted based at least in part on whether the UCI part is associated with enhanced mobile broadband (eMBB) traffic or ultra-reliable low-latency communication (URLLC) traffic.

* * * * *